(12) United States Patent
Pendse

(10) Patent No.: US 8,359,319 B2
(45) Date of Patent: Jan. 22, 2013

(54) TOOL FOR PERSONALIZED SEARCH

(76) Inventor: Sudhir Pendse, Los Altos, CA (US)

(*) Notice: Subject to any disclaimer, the term of this patent is extended or adjusted under 35 U.S.C. 154(b) by 962 days.

(21) Appl. No.: 12/229,290

(22) Filed: Aug. 21, 2008

(65) Prior Publication Data

US 2009/0063475 A1    Mar. 5, 2009

Related U.S. Application Data

(60) Provisional application No. 60/966,359, filed on Aug. 27, 2007.

(51) Int. Cl.
   *G06F 17/30* (2006.01)
(52) U.S. Cl. ............... 707/748; 707/752; 707/754
(58) Field of Classification Search .............. 707/748, 707/752, 754
   See application file for complete search history.

(56) References Cited

U.S. PATENT DOCUMENTS

| | | | | |
|---|---|---|---|---|
| 5,740,549 | A  * | 4/1998 | Reilly et al. | 705/14.42 |
| 8,190,590 | B2 * | 5/2012 | Lawlor | 707/706 |
| 2002/0010757 | A1 * | 1/2002 | Granik et al. | 709/218 |
| 2002/0099829 | A1 * | 7/2002 | Richards et al. | 709/227 |
| 2005/0071328 | A1 * | 3/2005 | Lawrence | 707/3 |
| 2007/0011155 | A1 * | 1/2007 | Sarkar | 707/5 |
| 2007/0067297 | A1 * | 3/2007 | Kublickis | 707/9 |
| 2007/0112960 | A1 * | 5/2007 | Joy et al. | 709/224 |
| 2008/0071616 | A1 * | 3/2008 | Hovnanian et al. | 705/14 |
| 2008/0072249 | A1 * | 3/2008 | Hovnanian et al. | 725/34 |
| 2009/0049077 | A1 * | 2/2009 | Lawlor | 707/102 |

* cited by examiner

*Primary Examiner* — Baoquoc N To
(74) *Attorney, Agent, or Firm* — D. A. Neville

(57) ABSTRACT

The invention provides for customized display of search results to Users. The invention further provides for customization of associated advertisements. The invention further provides for a dynamic personal knowledge base that is kept private. The invention provides an Intelligent Web Proxy that re-sorts search results based on the contents of the personal knowledge base (PKB) and creates a display customized to User preferences. The invention also automatically tracks and updates User activity, and "learns" User preferences.

4 Claims, 3 Drawing Sheets

TOOL FOR PERSONALIZED SEARCH

RELATED APPLICATIONS

This application claims priority from U.S. provisional application 60/966,359, of the same title and by the same inventor, filed Aug. 27, 2007.

GOVERNMENT FUNDING

None

FIELD OF USE

The invention relates to Internet use and searching. The invention more particularly related to private, personal customization of internet use and searching, and more particularly to customization of the sorting and display of search results according to User personal preferences and personal data, and where User personal preferences and data are not required to be shared but may remain private as User may elect.

BACKGROUND

Searching for information on the Internet has become second nature for most computer users. Search engines such as Google, Yahoo!, and MSN provide a sorted list of results for a query based on globally optimized criteria like keyword match, relevance, and most viewed. But what search engines currently lack is the ability to provide a list of search results sorted specifically for a user based on the user's individual likes, dislikes and interests.

Privacy concerns limit the amount of personal information that can be kept, and scalability issues limit the individualized query processing that a search service can provide. What is needed is a means to personalize search results. What is also needed is a means to automatically learn personal preferences, and maintain this personal data securely and privately. What is further needed is a solution to provide personal ranking of search results. Also needed is a means to harmonize personalized search results methodology with Internet-implemented revenue models, in particular, advertisement revenue.

BRIEF SUMMARY OF THE INVENTION

The invention herein meets at least all of the aforementioned needs. The invention provides a means whereby a User can personalize search results. Referred to herein as "the invention" or, alternately, as "myFnd™" a business denomination, the invention provides a personalized search, software solution that re-sorts the output of popular search engines like Google, Yahoo! and MSN based on automatically learned and locally stored, private personal preference history.

The inventive method, embodied in software resident on a User computing device, provides a "search globally, sort locally" approach. The invention collects the output from one or more globally optimized search engines and sorts and displays it locally based on automatically learned, individual preference history. The information collected pertaining to User personal preferences resides locally on a User controlled computing device. Security is preserved as User preference history remains on User controlled computing device, and is not shared or uploaded to the Internet. Thus, for any User initiated Internet search, the invention provides a globally optimized search result list from the results obtained via Internet search engines, and such optimized search result list may be further locally optimized according to User personal preferences.

The invention provides an intelligent web proxy enabling a User to essentially self-monitor computer usage such as urls visited, and time spent on various sites, and store personal use data on a local hard drive, for example. Not only is usage history maintained privately, the Usage information provides a comprehensive an secure private customized "smart" database that dynamically "learns" about the User preferences (also referred to herein as a "private personal preference knowledge base", or PKB, personal knowledge base). Moreover, the database, mediated by the Intelligent Web Proxy (IWP) in addition to automatically monitoring User internet activity and learning personal preferences thereby, the User may also actively configure the IWP so as to further fine tune customization of search results presentation.

In practice, it can be appreciated that the invention provides a local customized sorting of search results in response to search engine mediated searches as well as a history of internet use without search engine as intermediary. While some search engines currently maintain user search histories, a user is not provided a comprehensive search record if a variety of search engines are used. Further, to the extent a User used the Internet and visits urls directly, without using a search engine intermediary, that User activity is not "captured." And some Users are unwilling to provide personal information to search engines providing such a history of use, on the grounds that control of personal information is compromised, and unforeseeable breaches of personal privacy may ensue. Thus it can be appreciated that the invention provides a comprehensive, secure personal tool capable of automatically learning user preferences and re-ranking search results in a customized manner.

In the preferred embodiment, customization of search results is performed by means of applying a scoring system tailored to user preference data. Key word occurrence information from user searches and internet web surfing is stored in the PKB (personal knowledge base) and new search results are analyzed for key word occurrence, re-ranked according to the scoring system, and a customized ranking presented to the User.

Similarly, Internet distributed advertisements likewise can be amenable to re-ranking and customized presentation to a User. An economic incentive for User participation in such personalized advertisement is discussed herein.

DETAILED DESCRIPTION OF A PREFERRED EMBODIMENT

Figure 1:
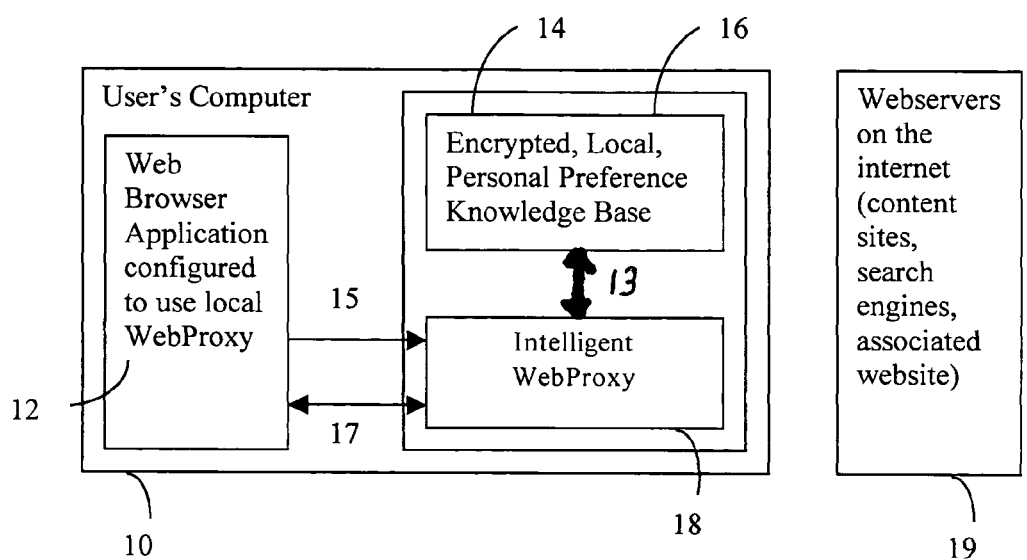
FIG. 1 depicts User configuration of Intelligent Web Proxy settings.

An embodiment of the invention is discussed herein below. Personalized searching according to the inventive method provides features such as locally resident Intelligent Web Proxy, and an automated personalization and storage of personal preferences unique to the User.

Locally resident Intelligent Web Proxy. An Intelligent Web Proxy (IWP) program is installed on a User's computer and the User's web browser program is configured to use this locally running web proxy. The IWP program sits between the web browser and web servers. All requests made by the User via the web browser and all responses received from web servers on the Internet pass through this Intelligent Web Proxy.

Automated Learning of Personal Preferences and Storage in an Encrypted, Local, Personal Preference Knowledge Base. When a User clicks on a particular link, or specifies a URL, the request passes through the Intelligent Web Proxy. The Intelligent Web Proxy automatically saves the keywords and description associated with the link if available, and the URL as a Node in a private personal preference knowledge base (also referred to herein as PKB). The IWP also assigns Points to each Node based on frequency, duration and recentness of visit. Such points indicate weights or scores reflecting user activity. It can be appreciated that the scoring system may be simple or highly sophisticated, depending on the factors of user behavior being monitored by the IWP.

The keywords and description are broken up into words and commonly occurring stop words like "and" and "is" are removed. Word stemming can also be employed to reduce the word variants to a common base word. The remaining words are added to a list and assigned an index. These indexes are saved in the Nodes. The Nodes are organized into various structures internally in the private Personal preference Knowledge Base (PKB) to facilitate efficient searching and ranking of queries. Information in multiple languages can be stored in the PKB. Moreover, the PKB can be further adapted to recognize other indexable media, such as audio or video.

The PKB grows dynamically according to User Internet usage, and is periodically saved locally on the User's computer and is encrypted to protect the User's privacy. When the IWP gets started at boot up time, it will read the contents of the stored encrypted PKB file.

Determination of Personal Preference Score. Given a list of keywords, description and URL, the PKB can be queried to determine a personal preference score. This is done by matching the words in the keywords, description and URL of the query with the words in the keywords, description and URL associated with the Nodes in the PKB. Points associated with the Nodes that match the query are used to determine the query's personal preference score.

Re-Sorting of Search Results based on Personal Preference Score, and re-creation of web responses. When a search query is made on previously configured list of search engines, the web responses received by the Intelligent Web Proxy are parsed and individual items in the search results list returned are separated. The Personal Knowledge Base (PKB) is queried for each of the individual items to determine the item's personal preference score. The search results list is then re-sorted based on the individual item's personal preference score, and a modified web response is recreated and displayed or otherwise communicated to User. Advertisements, if enabled and present, can also be re-sorted based on a corresponding personal preference score. In the preferred embodiment, such a re-sorted response is then passed on to the User's web browser for display. Additional ads can also be inserted in the recreated web response. The Intelligent Web Proxy can be setup to request more than the usual 10 search results from the configured search engines.

Regeneration of Ad urls to receive a share of web advertisement revenue. A share of the advertisement click revenue can be received from the search engine sites by inserting a company identifier for "myFnd" inside the advertisement link URLs of the newly generated response page containing the re-sorted list. A share of advertisement display/impression revenue can be received by introducing a company identifier for "myFnd" in the initial search request generated.

Collation of search results from multiple search engines. The same search query can be sent to a list of configured search engines, and the responses from all of the search engines collated, duplicates removed, and the resultant list re-sorted based on the items' personal preference scores. If each of the search engine results also included advertisement lists, then the number of advertisements displayed from each search engine would be related to the number of the search engine's search results displayed.

Collation of search results from multiple sites can be done by an associated web server on the Internet, which would provide this service like "myFnd.com". It can, if requested, provide responses in a manner that would make it easier for the Intelligent Web Proxy to parse the response. In the preferred embodiment, such a service will not get any information from the Personal Knowledge Base, and the work of re-sorting based on personal preference scores will only be done locally on the user's machine.

Configuration of Intelligent Web Proxy Settings. A web query made to the local proxy address will allow the Intelligent Web Proxy settings like the specification of the web proxy port, search engine URLs to be monitored, and enabling the display of advertisements, to be configured by the user. Additionally, the Personal Knowledge Base can also be manually edited to delete, add, or otherwise modify the automatically learnt preferences and influence the sorting.

Information Flow. Three different user interactions and the associated information flows are described in the figures as follows:

FIG. 1: User configuration of Intelligent Web Proxy settings.

Figure 2:
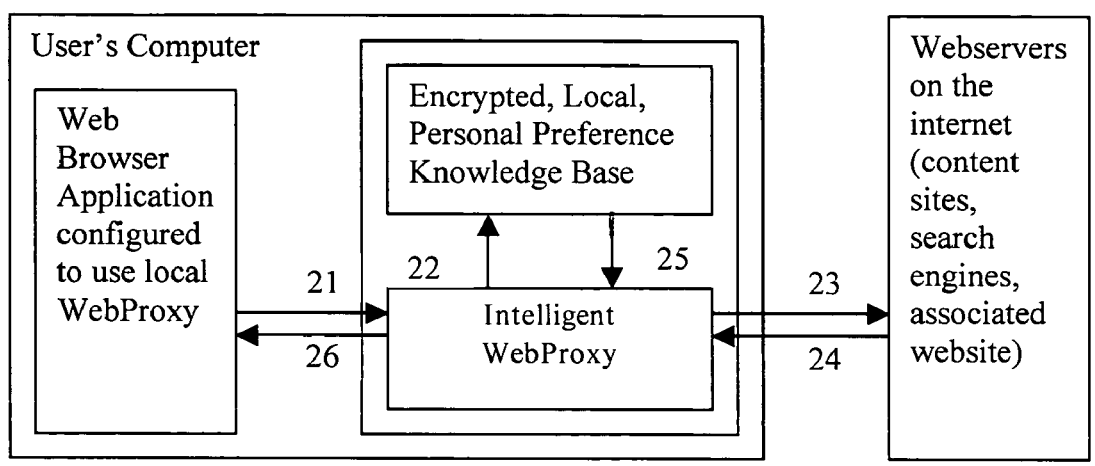
FIG. 2 depicts information flow in the case of a User surfing the web with a web browser that is configured to use the locally resident intelligent web proxy.

FIG. 2: User surfing the web with a web browser that is configured to use the locally resident Intelligent Web Proxy.

Figure 3:
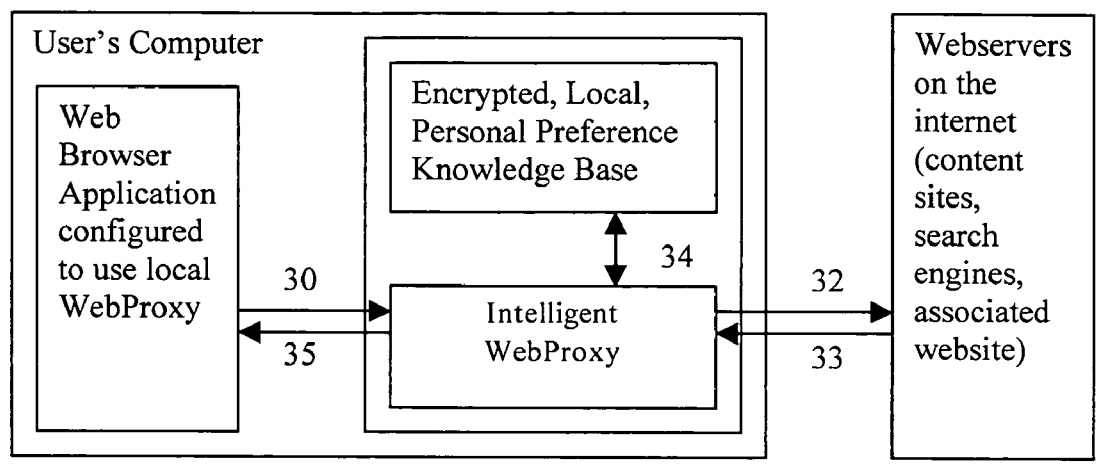
FIG. 3 depicts information flow in the case of a User performing Internet searches on previously specified search engines using a web browser that is configured to use the locally resident Intelligent Web Proxy.

FIG. 3: User performing Internet searches on previously specified search engines using a web browser that is configured to use the locally resident Intelligent Web Proxy.

FIG. 1 provides an illustration of the manner in which Information Flows During Configuration of Web Proxy according to the preferred embodiment. The User [from user computer 10] uses a Web Browser 12 and specifies the URL of the locally running Intelligent Web Proxy to connect 15 to it. (e.g.: http://localhost:8080) when the Intelligent Web Proxy 18 is running on port 8080). The Intelligent Web Proxy 18 responds 17 with an html page that allows the user to configure the various settings for the Intelligent Web Proxy such as, for example, the specification of Internet search engines 19 to monitor, or changing the default port number on which the Intelligent Web Proxy is running, or editing the contents of the Personal Knowledge Base 13. The Personal Knowledge Base (PKB) 14 is shown a residing on the User's local computing device.

In another embodiment, the Intelligent Web Proxy could be included inside the Web Browser itself. The Encrypted, Local Personal Preferences Knowledge Base (PKB) 14 may also reside directly in the Web Browser 12 or externally on the user's computer. The configuration of the Intelligent Web Proxy could then be carried out through the configuration of the Web Browser itself.

FIG. 2 illustrates the manner in which Information Flows During Web Surfing according to the preferred embodiment. User uses a Web Browser 12 that is configured to send requests 21 via a locally resident Intelligent Web Proxy 18 to surf 23 the Internet or World Wide Web (web servers on the internet) 19.

It is essential to appreciate that each User has his or her preferences. An example we will use to illustrate this concept is the comparison of how the IWP and PKB serve two hypothetical Users, Jane and John. Jane is an Ornithologist and visits www.birds.cornell.edu and John is a football fan who visits www.atlantafalcons.com.

As web requests and responses flow through the Intelligent Web Proxy 18, the IWP is aware of this web surfing and it updates 22 the encrypted personal preference knowledge base (PKB) 16 with this information. If the web surfing immediately follows a search result display, additional keyword and description information from the previous search list display can also be associated with the Node. Time spent in viewing last web page is also updated when available. This updating of the PKB file by the Intelligent Web Proxy provides the automatic and continued learning of User preferences. To use the example of our two hypothetical Users, Jane and John, Jane's knowledge base will contain Nodes with birds.cornell.edu, while John's knowledge base will contain Nodes with atlantafalcons.com).

The Intelligent Web Proxy forwards 23 the request to the specified web server without any changes. (E.g.: request sent to web servers at cornell.edu and atlantafalcons.com). Web servers will respond 24 with information (e.g.: responses from cornell.edu and atlantafalcons.com).

The Intelligent Web Proxy 18 parses a response, if configured, to get header information for adding keywords and description to Nodes in the Personal Knowledge Base (PKB) 25. As in our Jane and John example, in Jane's case, the IWP will add "All about birds" from the Title of the HTML response to the Node in Jane's Personal Knowledge Base, and in John's case, "Atlanta Falcons" from the Title of the HTML response to the Node will be added in John's Personal Knowledge Base.

In this case, the Intelligent Web Proxy 18 forwards the response 21 without change for display to the User.

FIG. 3 illustrates the manner in which Information Flows During Internet Searching. User uses a Web Browser that is configured to send requests via a locally resident Intelligent Web Proxy to conduct Internet searches on previously specified search engines. To use our example, Users Jane and John may each be searching using the word "falcons" via a search engine such as, for example, google.com.

As web requests and responses flow through the Intelligent Web Proxy, the IWP is aware of this web request 30 and it will recognize that the request is to be sent to a previously specified search engine. If configured to modify outgoing requests, the IWP will update the request to add a company identifier, and send the request 32 to the specified search engine. The search engine will respond with the search results 33 that include a list of links to various web sites. Each item in the search result list will typically include a set of keywords, a short description and the URL of the link. In our example, results to a search term "falcons" will include websites containing information about the sports team named Atlanta Falcons as well as websites germane to birds, including the falcon bird.

The Intelligent Web Proxy parses the search results response received from a previously specified search engine, breaks up the search result list into individual items, and temporarily saves it. The IWP then queries the Personal Knowledge Base (PKB) 34 to determine the personal preference score for each of the items. If configured, the IWP will also determine the personal preference score for the advertisements displayed. Returning to our example of Jane and John, queries to Jane's Personal Knowledge Base (PKB) will result in higher personal preference scores for items related to birds. Queries to John's PKB will result in higher personal preference scores for items related to the sports team "Atlanta Falcons".

The Intelligent Web Proxy creates a new response 35 that contains a re-sorted list of search results based on the personal preference score. If configured, the IWP will also re-sort any advertisements displayed along with search results. Furthermore, if configured, the IWP will also add a company identifier to the url associated with the advertisement. According to IWP configuration, the IWP can also insert additional advertisements in the response that is then sent to the User's web browser for display.

Turning again to the example of Jane and John, given the same query performed by Jane and John, search results will show up differently on their individual screens. Jane's search results will show search items related to birds at the top of the list, while John's search results would show search items related to the Atlanta Falcons at the top. Moreover, any accompanying advertisements are also displayed according to individual preferences. This is further illustrated by the sample results herein below.

Example of Search Results of "Falcons" from a Search Engine

1) Atlanta Falcons|Home
2) Falcons—Wikipedia
3) All About Birds: Peregrine Falcons
4) Springfield Falcons
5) Atlanta Falcons: News, Scores, Schedules, Stats
6) ESPN: Atlanta Falcons
7) SI: Atlanta Falcons
8) A Falconer's Memoir
9) Atlanta Falcons Team Page
10) Springfield Falcons Hockey News Example Scores Given for Each of the Search Items Using Jane's Personal Preference Knowledge Base (PKB)

| | |
|---|---|
| Atlanta Falcons|Home | Score 1 |
| Falcons - Wikipedia | Score 6 |
| All About Birds: Peregrine Falcons | Score 8 |
| Springfield Falcons | Score 1 |
| Atlanta Falcons: News, Scores, Schedules . . . | Score 1 |
| ESPN: Atlanta Falcons | Score 1 |
| SI: Atlanta Falcons | Score 1 |
| A Falconer's Memoir | Score 7 |
| Atlanta Falcons Team Page | Score 1 |
| Springfield Falcons Hockey News | Score 1 |

Example of Search Results as Displayed on Jane's Computer Based on Resorting Using the Preference Scores 1) All About Birds: Peregrine Falcons
2) A Falconer's Memoir
3) Falcons—Wikipedia
4) Atlanta Falcons|Home
5) Springfield Falcons
6) Atlanta Falcons: News, Scores, Schedules, Stats
7) ESPN: Atlanta Falcons
8) SI: Atlanta Falcons
9) Atlanta Falcons Team Page
10) Springfield Falcons Hockey News Example of Scores Given for Each of the Search Items Using John's Personal Preference Knowledge Base (PKB)

| | |
|---|---|
| Atlanta Falcons\|Home | Score 8 |
| Falcons - Wikipedia | Score 3 |
| All About Birds: Peregrine Falcons | Score 2 |
| Springfield Falcons | Score 4 |
| Atlanta Falcons: News, Scores, Schedules . . . | Score 8 |
| ESPN: Atlanta Falcons | Score 7 |
| SI: Atlanta Falcons | Score 8 |
| A Falconer's Memoir | Score 1 |
| Atlanta Falcons Team Page | Score 7 |
| Springfield Falcons Hockey News | Score 4 |

Example of Search Results as Displayed on John's Computer Based on Re-Sorting Preference Scores
1) Atlanta Falcons\|Home
2) Atlanta Falcons: News, Scores, Schedules, Stats
3) SI: Atlanta Falcons
4) ESPN: Atlanta Falcons
5) Atlanta Falcons Team Page
6) Springfield Falcons
7) Springfield Falcons Hockey News
8) Falcons—Wikipedia
9) All About Birds: Peregrine Falcons
10) A Falconer's Memoir
Example of Ad Results for "Falcons" from a Search Engine
1) Falcons Clip Art
2) Atlanta Falcons On Sale
3) Action Sports Pictures
4) Falcons Hat—NFL Shop
5) Blue Falcon Bird
Example of Scores Given for Each of the Ad Items Using Jane's Personal Preference Knowledge Base (PKB)

| | |
|---|---|
| Falcons Clip Art | Score 3 |
| Atlanta Falcons On Sale | Score 1 |
| Action Sports Pictures | Score 1 |
| Falcons Hat - NFL Shop | Score 1 |
| Blue Falcon Bird | Score 7 |

Example of Ad Results as Displayed on Jane's Computer Based on Resorting Using the Preference Scores.
1) Blue Falcon Bird
2) Falcons Clip Art
3) Atlanta Falcons On Sale
4) Action Sports Pictures
5) Falcons Hat—NFL Shop
Example Scores Given for Each of the Ad Items Using John's Personal Preference Knowledge Base (PKB)

| | |
|---|---|
| Falcons Clip Art | Score 3 |
| Atlanta Falcons On Sale | Score 7 |
| Action Sports Pictures | Score 6 |
| Falcons Hat - NFL Shop | Score 8 |
| Blue Falcon Bird | Score 2 |

Example of Ad Results as Displayed on John's Computer Based on Resorting Using His Personal Preference Knowledge Base (PKB)
1) Falcons Hat—NFL Shop
2) Atlanta Falcons on Sale
3) Action Sports Pictures
4) Falcons Clip Art
5) Blue Falcon Bird
The examples provided herein are for illustration, and not intended to limit the scope of the invention. It can be appreciated that the Intelligent Web Proxy may reside on the Users computing device, or may be included within the browser and configurable by the User. Secure storage of personal data may also be accomplished in manners other than on the users computing device. Further, the scoring of the preferred embodiment is merely one approach the invention enables with respect to customization of display as a function of a private personal knowledge base (PKB) as taught herein. Further, while the discussion and examples refer to display of re-ranked search results, it can be appreciated that not only may any media type, including graphic and audio be the objects of both preferences and searching, the communication of search results my be in any mode, whether visual display, audio or any form amenable to the User.

What is claimed is:

1. A method for creating and automatically continually updating and maintaining a personalized, private and comprehensive personal preference knowledge database, said method including the steps of:

monitoring, by means of a User configurable locally resident Intelligent Web Proxy, said Intelligent Web Proxy locally resident on said User's computing device, said User configurable Intelligent Web Proxy enabling User to privately self-monitor User computer usage including User usage of Internet Uniform Resource Locators; and where said User configurable Intelligent Web Proxy collects User data where said collected User data is and remains private to User, and where said collected User data associated with User usage of said Uniform Resource Locators, including title, keywords, description, time spent, frequency, and recentness of visit; and where said User configurable Intelligent Web Proxy is capable of generating personal preference scores for a given set of keywords, description and Uniform Resource Locator based on said collected User data; and stores said collected User data in said User's private, personal, preference knowledge database (abbreviated "PKB"), where said PKB is a secure database, and where said PKB is dynamically learning said User preferences as a consequence of User-self monitoring User's computer usage;

where said collected User data associated with User usage of said Uniform Resource Locators, including title, keywords, description, time spent, frequency, and recentness of visit, further includes storing the data in a secure database such that the user determines access to personal knowledge database (PKB) the sub steps of ranking and displaying to User some number of Internet propagated advertisements, where said ranking is performed locally on User's computing device with reference to said private personal preference knowledge database, and said display to User is re-sorted based on scores predicated on data stored in private personal preference knowledge database (PKB) by said locally resident User configurable Intelligent Web Proxy, where contents of User's private personal preference knowledge database remain private to User, and further including the sub step of:

regenerating of Uniform Resource Locators associated with said Internet propagated advertisements displayed to User so as to include information quantifying the amount each displayed Internet propagated advertisement advanced in display rank as a consequence of said locally resident User configurable Intelligent Web Proxy interacting with said User's private personal preference knowledge database (PKB), such that said regeneration of Uniform Resource Locators permits for allocation to User of a share of the web advertisement revenue, and where said share is computed based on the contribution made by the usage of information in User's said private personal preference knowledge database (PKB) in advancing the rank of the displayed advertisement.

2. The method as in claim 1 wherein the inclusion of a display identifier in the original search request provides for allocation of a share of web advertisement revenue to User, wherein said display identifier includes information about an entity that functions as a central collection agency for collecting the share of advertisement revenue to be distributed to User, said User's PKB (personal private preference knowledge database) identifier and a User display device identifier.

3. A system for creating, and automatically continually updating and maintaining a User's private personal preference knowledge database which serves to quantify the degree to which Internet propagated advertisements shifts display rank to said User as a consequence of re-ranking based on User's private personal preference knowledge database, and where said re-ranking provides a basis for compensating User, said system comprising:

a User device, said device equipped with a CPU and a display and Internet connectivity, said connectivity including a web browser, and storage capacity;

User configurable Intelligent Web Proxy, where said User configurable Intelligent Web Proxy is locally resident on said User device and monitors User's own Internet activity such that User's preferences are dynamically tracked while all User Internet activity information remains private to User;

User's private personal preference knowledge database (PKB) stored in said storage capacity of said User device, said User's private personal preference knowledge database (PKB) capable of being secured so as to permit user control over access to data stored therein; and said User's private personal preference knowledge database storing user data from said locally resident User configurable Intelligent Web Proxy such that when Internet propagated advertisements are obtained from more than one Internet search engine, obtained Internet propagated advertisements are re-ranked by said locally resident User configurable Intelligent Web Proxy in conjunction with said User's private personal preference knowledge database, and said obtained Internet propagated advertisements are displayed to User in an order that is determined according to said User's stored private, personal preferences as collected by said User configurable Intelligent Web Proxy locally resident on said User device, said User configurable Intelligent Web Proxy providing for the regeneration of Uniform Resource Locators associated with Internet propagated advertisement displayed to User so as to include information about the display identifier (entity identifier, User private personal preference knowledge base (PKB) identifier, display device), timestamp when the display occurred, original ad rank, displayed ad rank, to thereby provide information quantifying the amount the Internet propagated advertisement was advanced in display rank to User as a consequence of said User's private personal preference knowledge database, for allocation of a share of the web advertisement revenue to said User associated with said display identifier, and where said share is computed based on the contribution made by the usage of information in said User's said private personal preference knowledge database (PKB) in advancing the rank of the displayed advertisement.

4. The system as in claim 3 wherein said inclusion of a display identifier in the original search request functions to obtain for User a share of the advertisement revenue, wherein said display identifier includes:

entity identifier, said entity identifier providing information about the entity that functions as a central collection agency for collecting the share of advertisement revenue to be distributed to users, said User private personal preference knowledge database (PKB) identifier; and said User display device identifier.

* * * * *